Dec. 10, 1929.    G. W. WHITE    1,739,380
HEADER THRASHING ATTACHMENT
Filed March 25, 1927    3 Sheets-Sheet 1
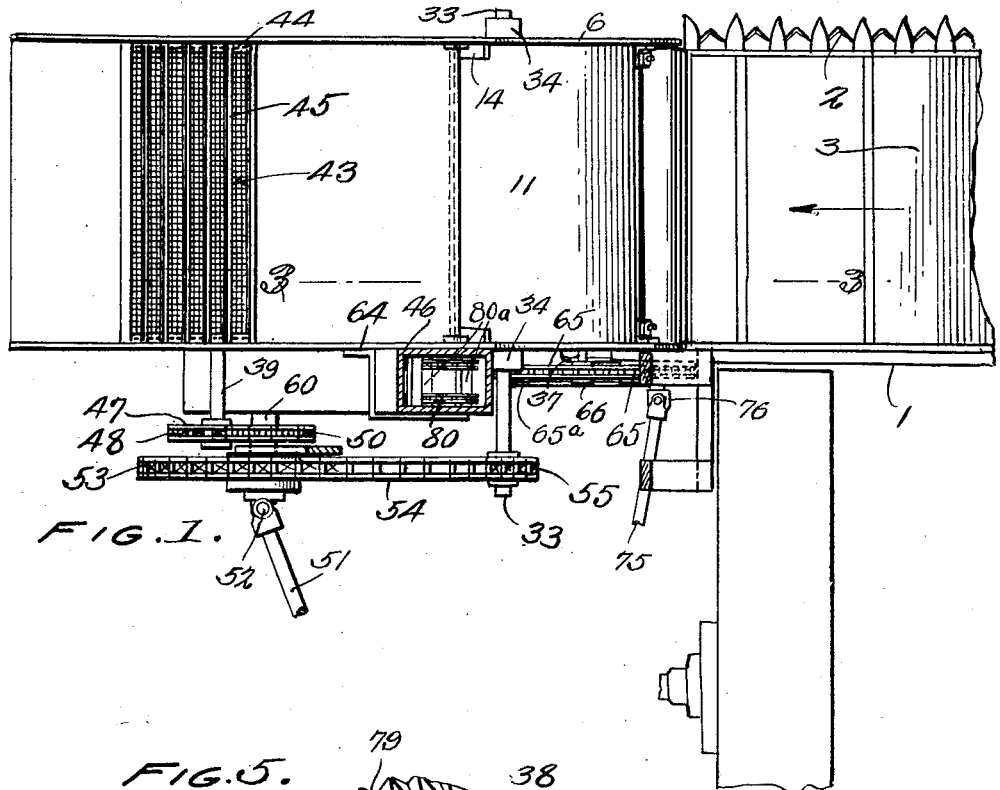
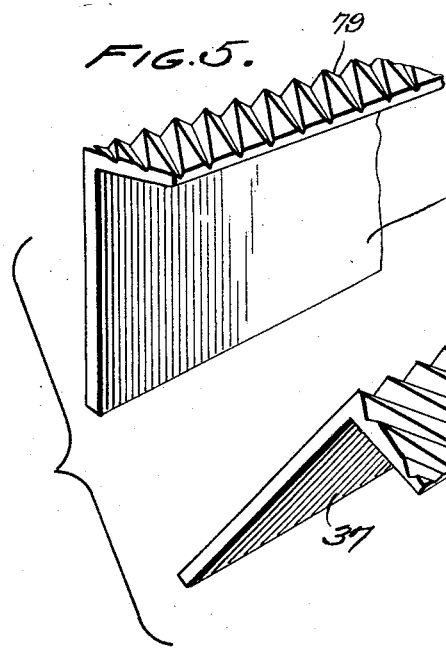
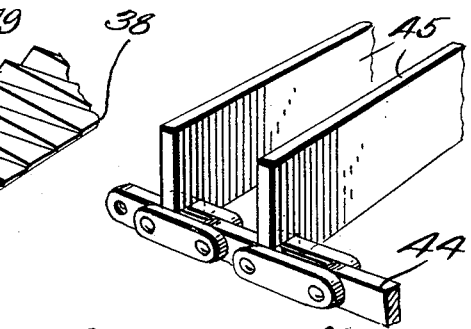
GEORGE W. WHITE
Inventor
By C. A. Snow & Co.
Attorneys Dec. 10, 1929. G. W. WHITE 1,739,380
HEADER THRASHING ATTACHMENT
Filed March 25, 1927 3 Sheets-Sheet 2
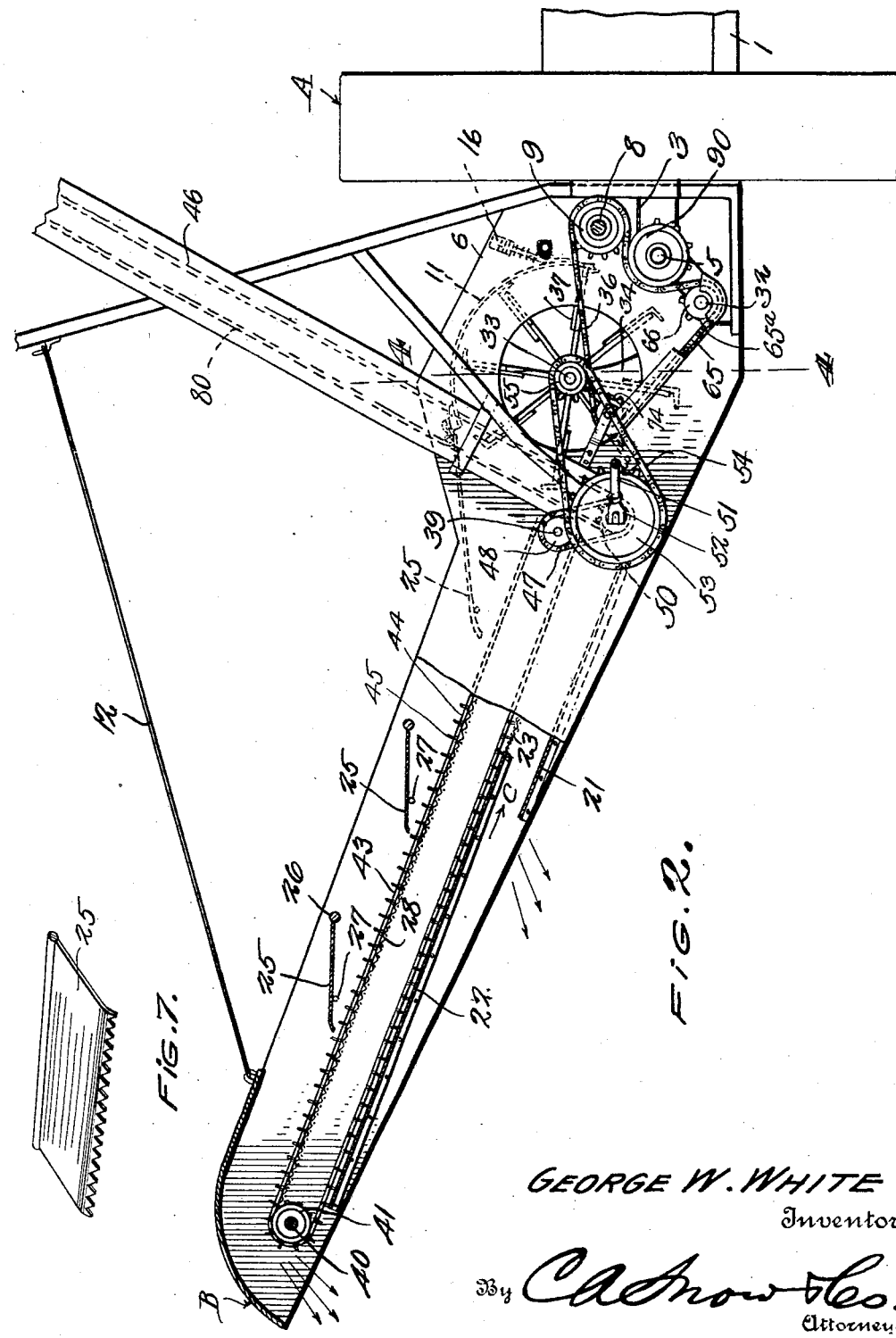

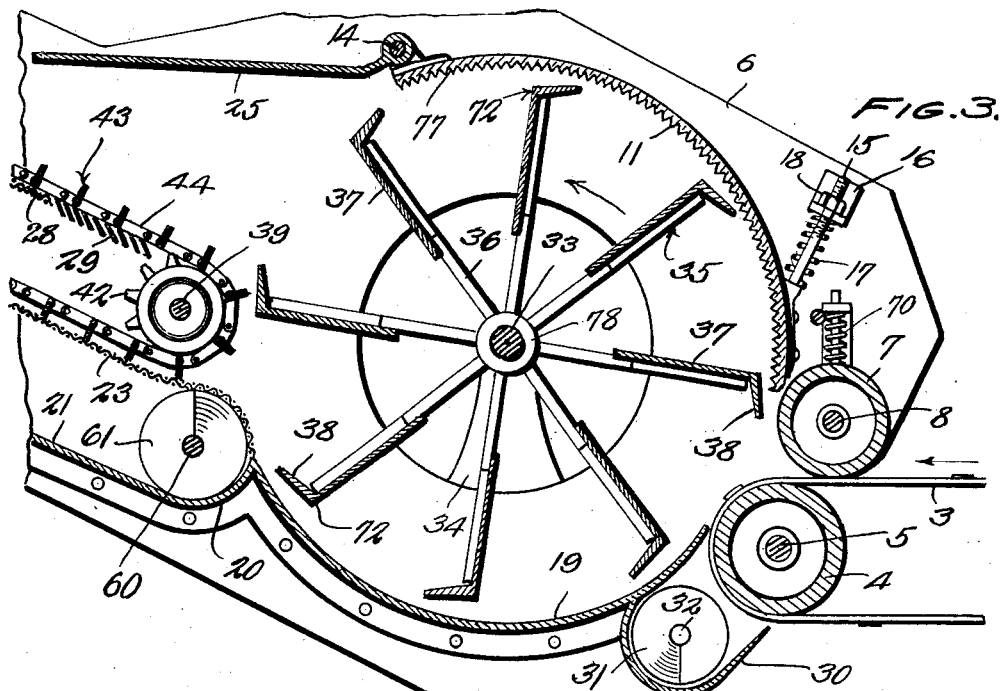
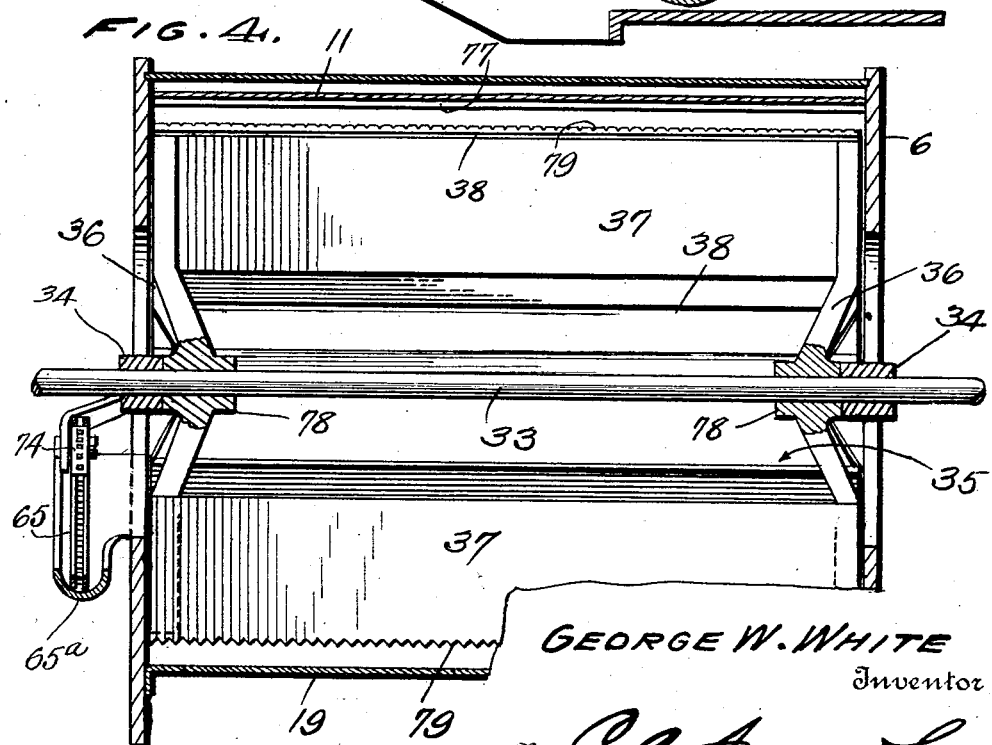

Patented Dec. 10, 1929

1,739,380

UNITED STATES PATENT OFFICE

GEORGE W. WHITE, OF HUTCHINSON, KANSAS, ASSIGNOR TO J. S. EDWARDS, OF KANSAS CITY, MISSOURI

HEADER THRASHING ATTACHMENT

Application filed March 25, 1927. Serial No. 178,247.

Broadly considered, this invention aims to provide a thrashing attachment adapted to be used on a header in place of the elevator, the construction being such that the grain may be thrashed in the field as the grain is cut, and as the header and the thrashing attachment move over the field.

Another object of the invention is to provide a device of the class described wherein the rotor, which cooperates with the concave, operates also as a fan for cleaning the grain.

Another object of the invention is to provide novel means whereby the pieces of heads and caps which are taken back with the straw, will be carried forward to be re-thrashed.

A further object of the invention is to provide a novel form of corrugations in the rotor, which, cooperating with the corrugations of the concave, move the material back and forth on the concave with a rasping motion.

Another object of the invention is to provide novel means for holding up the straw on the straw conveyor, and for raking out the straw thin on the straw conveyor.

A further object of the invention is to provide a straw conveyor which carries the straw backwardly over an upper screen, and moves the grain and the tailings forwardly to another screen.

Another object of this invention is to provide an overshot cylinder so operating that when the grain is discharged from the cylinder, it is thrown immediately through the screen, which separates it from the straw without all sorts of separation devices.

It is within the province of the disclosure to improve generally and to enhance the utility of devices of that type to which the invention appertains.

With the above and other objects in view which shall appear as the description proceeds, the invention resides in the combination and arrangement of parts and in the details of construction hereinafter described and claimed, it being understood that changes in the precise embodiment of the invention, herein disclosed, may be made within the scope of what is claimed, without departing from the spirit of the invention.

In the drawings:—

Figure 1 shows in top plan, a device constructed in accordance with the invention;

Figure 2 is a longitudinal section, parts being in elevation;

Figure 3 is a section taken about on the line 3—3 of Figure 1;

Figure 4 is a section taken about on the line 4—4 of Figure 2;

Figure 5 is a composite perspective view showing portions of two adjoining blades of the rotor;

Figure 6 is a perspective view showing a part of the straw conveyor;

Figure 7 is a perspective view showing one of the rakes.

That end of the machine which is marked by the letter A in Fig. 2 is the forward end: and the rear end is designated by the letter B. Terms will be selected accordingly in defining the relative positions of parts.

The numeral 1 marks the frame work of a header platform, the header including a cutting means 2, which is adapted to sever the standing grain. After the standing grain has been cut by the mechanism shown at 2, the grain is received on a conveyor 3, extended about a pulley 4 on a shaft 5, the shaft being journaled in a chute 6 which is connected to the frame work of the header, and suspended therefrom as shown at 12. There is a sprocket wheel 90 on the outer end of the shaft 5, as shown in Figure 2. At the inner end of the conveyor 3 there is a roll 7 which cooperates with the upper run of the conveyor 3. The roll 7 is carried by a shaft 8 journaled in bearings which are spring-pressed as shown at 70. On the end of the shaft 8 there is a sprocket wheel 9. A concaved bottom 19 is secured between the side walls of the chute 6 and has a trough-like extension 30 at its forward end. In the chute 30 there operates a worm conveyor 31 carried by a shaft 32 journaled in the chute 6. There is a sprocket wheel 66 on the shaft 32, as shown in Figure 2. An idle sprocket 74 is supported for rotation on the chute 6. A sprocket chain 65 is engaged around the idle sprocket 74 and is engaged with the sprocket wheel 9 on the shaft 8, with the sprocket wheel 90 on the shaft 5, and with the sprocket wheel 66 on the shaft 32. The numeral 75 in Figure 1 designates a shaft which is operated from the gearing (not shown) on the header 1, the shaft 75 being connected by means of a universal joint 76 with the shaft 8. The grain is cut down by the header cutting mechanism shown at 2 and is received on the conveyor 3. The conveyor 3 carries the grain along under the adjustable roll 7, and any loose kernels of grain which may be on the conveyor 3, or which may happen to be blown to the right as shown in Figure 3, by the operation of the rotor (hereinafter described) will be received in the chute 30 and be carried laterally by the worm conveyor 31. So far as the drive to the parts above-mentioned is concerned, it may be stated that the shaft 75 and the universal joint 76 of Figure 1 impart rotation to the shaft 8 (Figure 2), the sprocket wheel 9 on the shaft 8 cooperating with the sprocket chain 65 to impart rotation to the worm conveyor 31 by way of the sprocket wheel 66 and the shaft 32, the chain 65 driving the shaft 5 and the pulley 4 by way of the sprocket wheel 90, the pulley 4 operating the conveyor 3.

Up to the present point it has been explained how the grain is cut down and carried into that part of the machine which is shown best in Figure 3, to wit, into operative relation with respect to the cylinder and the concave, and it has been pointed out how loosened kernels of grain are carried laterally by means of the worm conveyor 31. The description of the rotor or cylinder, the concave, and attendant parts, will now be given.

A concave 11 is provided, and has transverse corrugations, marked by the numeral 77. The concave 11 is pivotally mounted at its rear end, on the sides of the chute 6, as shown at 14. Adjusting rods 15 are mounted on the front portion of the concave 11 and are adapted to move vertically in brackets 16 on the side walls of the chute 6. Compression springs 17 are mounted on the rods 15, the upper ends of the springs 17 bearing against the brackets 16, and the lower ends of the springs bearing on the concave 11. The springs 17 hold down the forward end of the concave 11, downward swinging movement of the concave being limited by the engagement between nuts 18 on the rods 15, and the brackets 16. It is possible to adjust the position of the concave 11 by means of the nuts 18. The springs 17 hold the concave 11 down hard enough so that, ordinarily, it will cooperate with the cylinder or rotor (hereinafter described), to shell out the kernels of grain, but in case of an extreme jam, the concave 11 can rise a little at its forward end, the springs 17 yielding for that purpose.

The device includes a shaft 33 which is supported for rotation in bearings 34 located on the outer sides of the walls of the chute 6, or elsewhere. The shaft 33 carries a rotor or cylinder, which, as a whole, is marked by the numeral 35, the rotor operating in the forward end of the chute 6, beneath the concave 11, and above the bottom 19. The rotor 35 includes arms 36 connected to hubs 78 on the shaft 33. The arms 36 at the opposite sides of the machine are connected by blades 72, in the form of angle members, each blade comprising a radial body 37 and a circumferentially extended flange 38. On the outer surfaces of the flanges 38 there are corrugations 79, the corrugations 79 being laterally inclined, in opposite directions, in adjoining blades, as shown in Figure 5 of the drawings. The corrugations 79 on the flanges 38 of the blades 72 cooperate with the corrugations 77 of the concave 11, and the grain is rasped back and forth on the corrugations 77 of the concave 11, as the grain is carried around when the rotor 35 is turned. This rasping action loosens the kernels of grain, and is brought about by reason of the fact that the corrugations 79 on the flanges 38 of adjoining blades 72 of the rotor 35 are laterally inclined in opposite directions, as shown in Figure 5 of the drawings. The bodies 37 of the blades 72 operate as a fan, which creates a draft or blast of air toward the left in Figure 3 of the drawings and aids in cleaning the grain.

The bottom 19 has a trough-like extension 20 at its rear end, and the extension 20 is prolonged to form an inclined table 21 which is seen best in Figure 2 of the drawings. Above and behind the table 21 is located a platform 22 which is disposed parallel to the table 21. The forward end of the platform 22 overlaps the rear end of the table 21, as shown in Figure 2. A lower screen 23 extends forwardly from the front end of the platform 22 and is joined to the rear end of the bottom 19, the screen 23 extending forward and downwardly around a worm conveyor 61 operating in the trough-like extension 20 and carried by a shaft 60 which is journaled in the chute 6. The numeral 51 marks a shaft which is operated from the header 1, the shaft 51 being connected by a universal joint 52 with the shaft 60, to operate the shaft 60 and the worm conveyor 61. The shaft 60 operates a conveyor 80 having buckets 80ª and located within an upwardly extended conveyor housing 46 on one side of the chute 6. The worm conveyor 61 carries the cleaned grain into the housing 46, and the elevator 80 carries the clean grain upwardly and away. There is a large sprocket wheel 53 on the shaft 60, and this sprocket wheel drives a sprocket chain 54, the chain 54 being engaged with a sprocket wheel 55 on one end of the shaft 33. Motion thus being transmitted to the shaft 33 and to the rotor 35.

There is a sprocket wheel 50 on the shaft 60, and about the sprocket wheel 50 is trained a sprocket chain 47 engaged with a sprocket wheel 48 on a shaft 39 journaled in the chute 6 and located above and slightly to the rear of the shaft 60. Sprocket wheels 42 are mounted on the shaft 39. A shaft 40 is journaled in the rear end of the chute 6, and sprocket wheels 41 are mounted on the shaft 40. The sprocket wheels 41 and 42 receive an endless straw conveyer 43 which is made up of chains 44 carrying slats 45 which may be located any desired distance apart, say two inches. The upper run of the straw conveyor 43 moves rearwardly along the screen 28 and along the bars 29 at the forward end of the screen 28, and the lower run of the straw conveyor 43 moves forwardly along the platform 22 and the screen 23. The screen 23 is finer than the screen 28.

A plurality of rakes 25 are located along the chute 6 and are pivotally mounted as at 26, downward swinging movement of the rakes 25 being limited by stops 27 on the conveyor 6. The function of the rakes 25 will be explained hereinafter.

In practical operation, the grain is cut down by the means shown at 2 and is carried rearwardly by the conveyor 3, the loose grains dropping into the chute 30 to be carried away by the worm conveyor 31. The grain is carried upwardly and rearwardly in the direction of the arrow in Figure 3 and is rubbed and grated between the corrugations 77 of the concave 11 and the ribs 79 on the blades 72 of the rotor 35. The grain and the straw are carried rearwardly along the upper screen 28 by the upper run of the straw conveyor 43, and the straw is carried out of the rear end of the chute 4 as shown by the arrows in the left end of Figure 2. The grain falls through the screen 28 upon the table 22 and is carried forwardly in the direction of the arrow C in Figure 2 by the lower run of the conveyor 43, the grain falling through the screen 23, and being cleaned by the blast of air produced by the parts 37 of the rotor 35. The material which does not pass through the screen 23 is carried back to the rotor 35 and is re-thrashed. The material is wiped first in one direction along the screen 28, and then in an opposite direction along the screen 23, and because the rotor 35 creates a draft beneath the screen 23, the chaff is blown away off the rear end of the table 21, the clean grain moving downwardly and forwardly along the table 21 to the worm conveyor 61, by which the clean grain is carried into the field of operation of the conveyor 80 which operates in the conveyor housing 46. The rakes 25 distribute the straw evenly on the straw conveyor 43.

The loose kernels which are received in the chute 30, are carried by the worm conveyor 31 into an upwardly inclined runway 65ª. The chain 65 carries the kernels up the runway, and the air entering the opening in the side of the member 6 draws the kernels into the machine.

In this way, a small but appreciable amount of grain which otherwise would be lost, is saved.

What is claimed is:—

1. In a device of the class described, an upper screen, a straw conveyor movable along the screen, to keep the screen clean, the conveyor including upstanding slats which serve to space the material and carry it along the screen, a concave, a rotor cooperating with the concave and discharging on the conveyor, distributing rakes movably mounted above the conveyor and cooperating therewith, and a second screen wherewith the lower run of the conveyor cooperates to return the tailings to the rotor and the concave for re-thrashing, the second screen being located beneath the forward end of the conveyor and discharging immediately upon the rotor.

2. In a machine of the class described, the combination of an overshot-thrashing cylinder, a first screen onto which the cylinder discharges, an endless straw-carrying conveyor movable over the first screen, and a second screen below the first screen, to retain the tailings, the conveyor moving over the second screen in return motion, to return the tailings directly to the cylinder.

3. In a device of the class described, a concave having transverse corrugations, and a rotor supported for rotation and including blades, each blade comprising a substantially radial body and a circumferentially extended flange, the body being thin and of greater extent than the flange, and the body extending well toward the center of rotation of the rotor whereby the rotor will operate as a cleaning fan, the flanges of the blades of the rotor being provided with groups of laterally inclined corrugations, the corrugations of one group being laterally inclined in one direction, and the corrugations of the next adjoining group being laterally inclined in an opposite direction whereby the corrugations of the groups will cooperate with the corrugations of the concave to produce a rasping action, the corrugations of the concave and of the rotor being V-shaped in plan.

4. In a device of the class described, a concave, a rotor operating underneath the concave, and cooperating therewith to rasp the grains free, an inclined screen so placed that the rotor will throw the straw, chaff, and grain, downwardly from the rear end of the concave against the screen and project the wheat through the screen, a conveyor movable along the screen, and the rotor including substantially radial parts of sufficient area to act as an efficient fan, the conveyor serving to clear the screen of straw, and the fan serving to clear the screen of chaff, so that the grain may be projected through the screen, as aforesaid.

In testimony that I claim the foregoing as my own, I have hereto affixed my signature.

GEORGE W. WHITE.